A. H. HAMMOND.
OCTAVE COUPLER FOR ORGANS.
No. 10,832. Reissued May 3, 1887.
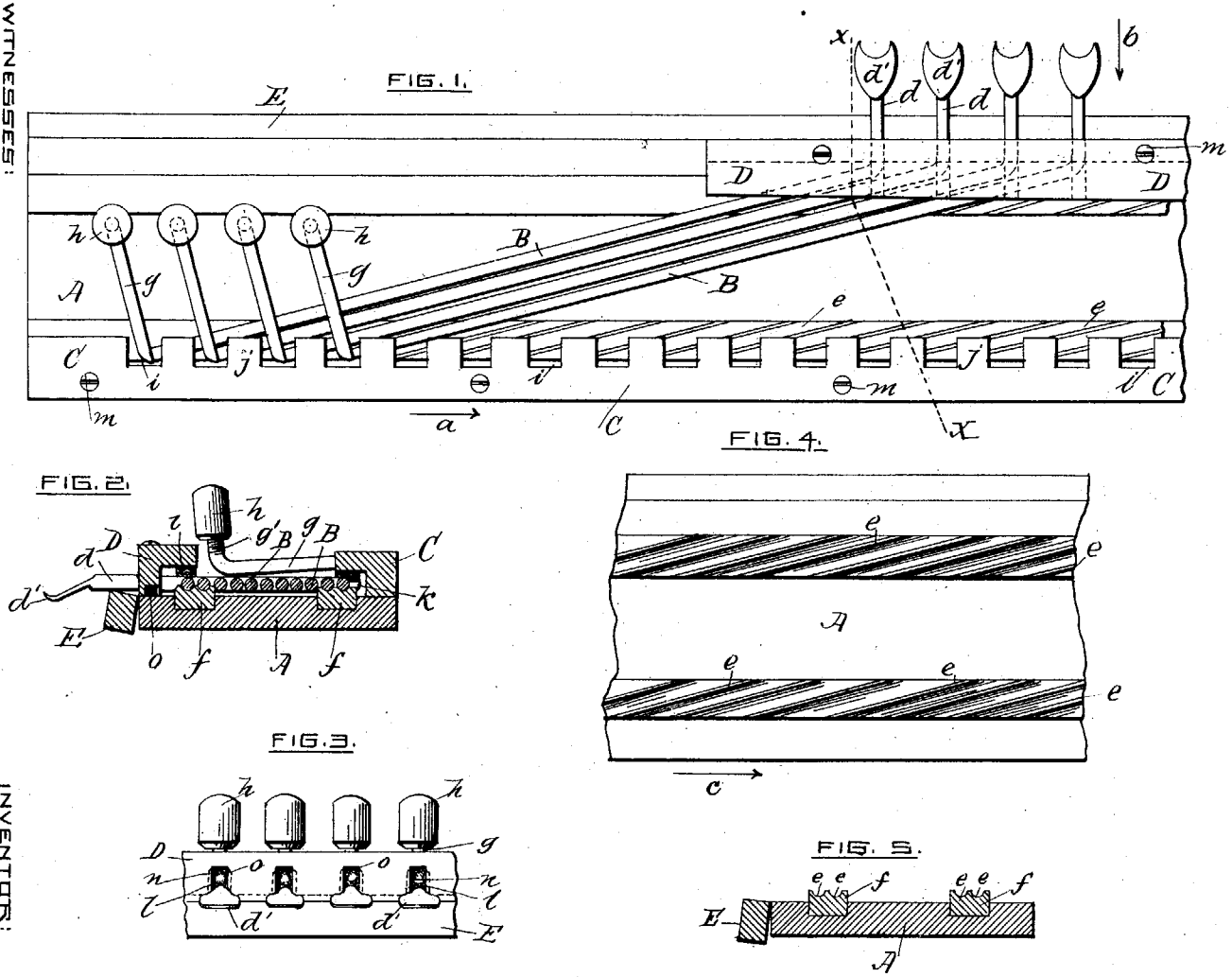
WITNESSES:
Thos. F. Schmelz
John C. Dewey
INVENTOR:
Archer H. Hammond
N. PETERS, Photo-Lithographer, Washington, D. C.

UNITED STATES PATENT OFFICE.

ANDREW H. HAMMOND, OF WORCESTER, MASSACHUSETTS.

OCTAVE-COUPLER FOR ORGANS.

SPECIFICATION forming part of Reissued Letters Patent No. 10,832, dated May 3, 1887.

Original No. 344,041, dated June 22, 1886. Application for reissue filed January 29, 1887. Serial No. 225,932.

*To all whom it may concern:*

Be it known that I, ANDREW H. HAMMOND, a citizen of the United States, residing at Worcester, in the county of Worcester and State of Massachusetts, have invented certain new and useful Improvements in Octave-Couplers for Organs; and I do hereby declare that the following is a full, clear, and exact description of the invention, which, in connection with the drawings, forming a part of this specification, will enable others skilled in the art to which it belongs to make and use the same.

My invention relates to an organ-coupler or octave-coupler device for organs and other similar instruments; and it consists in certain novel features of construction of the coupling device, as will be hereinafter fully described, and the nature thereof indicated by the claims.

Referring to the drawings, Figure 1 is a top or plan view of a section or part of the coupling device embodying my improvements, only four of the coupling-wires being shown. Fig. 2 is a cross-section taken on line *x x*, Fig. 1, looking in the direction of arrow *a*, same figure, the several coupling-wires not shown in Fig. 1 being shown in this figure. Fig. 3 is a view of the rear side of the right-hand end of the coupling device shown in Fig. 1, looking in the direction of arrow *b*, same figure, the coupling-wires left off in Fig. 1, being shown in this figure. Fig. 4 is a top or plan view of a section of the board for supporting the coupling-wires shown in Fig. 1, the coupling-wires and other parts being removed therefrom to more clearly illustrate one feature of my invention, to be fully described hereinafter; and Fig. 5 is an end view of the section shown in Fig. 4, looking in the direction of arrow *c*, same figure.

In the accompanying drawings, the part marked A is a table or board, upon which the coupling-wires are arranged and supported. It is intended to be applied to organs of different construction, and similar musical instruments, in any suitable and well-known manner, occupying the space under the key-board, so that the projecting ends *d'* of the coupling-wires B will come in contact with the upper side of the buttons or projections on the pitman-rods, which open the valves when the board A is raised, all in the usual and well-known manner employed in reed-organs provided with octave-couplers. The board A possesses certain novel features of construction, which I will now proceed to describe. It consists of a strip of wood having corrugations or grooves *e e* formed or made upon or in its upper surface, as shown in Fig. 4. These corrugations or grooves may extend the full width of the board, running diagonally lengthwise of the board, or may be made, as shown in the drawings, extending only along near the two edges of the board. The corrugations or grooves *e e* may be made in the top surface of the board itself, or may be made in separate strips or pieces, which are then secured to the board A in any suitable manner—in this instance by setting the strips *f f* into corresponding channels cut in the face of the board. (See Figs. 2 and 5.)

One main object and purpose of providing the upper side or surface of the board A with corrugations or grooves is to space off said board, so that the coupling-wires B may be very accurately and uniformly placed in their proper positions on said board, each coupling-wire B lying in one of said corrugations or grooves, which serves, not only to hold it in place and in its proper position, but also serves as a bearing in which the coupling-wire turns. These corrugations or grooves are placed very near one another and substantially parallel, in order that the coupling-wires may be placed as close to one another as practicable, without interfering with the movements one with another. By this means the coupling-wires are made to occupy much less width of space than has heretofore been practicable, and more nearly approximating to the longitudinal direction of the coupling-board, so that I am enabled to make a much narrower coupling-board than usual—a desideratum of great importance.

The coupling-wires B are all made alike, and placed and operated independently of each other, there being one of said coupling-wires for each key which it is desired to couple. A description of one of the coupling-wires shown in the drawings will therefore suffice for all. The coupling-wire B is made with its two ends or arms, *g* and *d*, bent at substantially right angles to the body of the coupling-wire, and substantially parallel with each other, the arm *g* being raised up so as to pass over the next coupling-wire in front of it, as shown in Fig. 1. The outer end, $g'$, of the arm $g$ is turned or bent up in this instance and provided with a thread, as shown in Fig. 2, on which a button or knob, $h$, is screwed. Said knob may be adjusted up or down on the end $g'$ of the arm $g$, as may be desired, so that the under side of the key, pressing upon the top of the button $h$, will properly operate the coupling-wire when the coupler is used.

I have described and shown the arm $g$ of the coupling-wire B having its end $g'$ bent or turned up, and provided with a knob, $h$, to be adjusted up and down thereon; but, if preferred, the arm $g$ of the coupling-wire B may be made in the usual and well-known manner, having its end flattened or otherwise, the regulating knob or button being secured upon the under side of the keys in the usual and well-known manner, instead of on the arm $g$.

The arm $d$ of the coupling-wire B has its end $d'$ flattened and cut out, as shown in Fig. 1, and it is also bent or curved, as shown in Fig. 2. The object of cutting out the end $d'$ and bending or curving it is to present a greater and better bearing-surface to rest upon the top or upper side of the button on the pitman-rod, and to bring the bearing surface near the centre of said button, to press down the pitman-rod and open the valve when the coupler is used.

I do not wish to limit myself to the cutting out of the end $d'$ of the arm $d$, as shown, for the end $d'$ may be simply flattened in the usual and well-known manner, to press upon the buttons on the pitman-rods, and used in connection with my improved coupler device.

Since the bodies of the conpling-wires are placed closely side by side, so as to be nearly in contact with one another, it is impracticable to introduce anything between the said bodies of the wires for the purpose of holding them in place, and for preventing longitudinal movement of the same. For these purposes I employ means substantially as hereinafter set forth.

In order to hold the coupling-wires B in place upon the board A and in their grooves or channels, I provide strips or binders C and D. The binder C is cut out upon its under side, as shown in cross section, Fig. 2, and has slots $i$ cut in its upper part, to allow the arms $g$ to rise and fall therein, and has projecting parts $j$, which are provided with felting or other pliable material, $k$, upon their under sides to extend over each coupling-wire, the felting $k$ bearing or pressing upon the top of each coupling-wire B, as clearly shown in Figs. 1 and 2 of the drawings. The binder C is secured upon the board A by means of screws $m$ or other equivalent means. The binder D is also cut out upon its under side, as shown in cross-section, Fig. 2, and a continuous strip of felting or other pliable material, $l$, is secured upon the under side to rest and bear upon the top part of the coupling-wires B. (See Fig. 2.) Slots $n$ are also cut in the under side of the binder D, through which the arms $d$ of the coupling-wires B extend, said slots $n$ being but a little wider than the diameter of the wire of which the coupling-wires B are made, thus allowing the arms $d$ to move freely up and down in said slots, and at the same time preventing any longitudinal movement of the coupling-wires B upon the board A.

The provision of vertical slots $n$ in the strip at the rear of the board A, through which the arms $d$ of the coupling-wires B project, as above described, and illustrated in the drawings, is essential for preventing any endwise motion of the coupling-wires upon the board A, and especially is this the case when only one binder or strip, as D, is used, as hereinafter set forth, for the binder C being dispensed with, the only means for preventing endwise motion of the coupling-wires B upon the board A are the vertical slots $n$ in the binder or strip at the rear of said board A, through which the arms $d$ of the coupling-wires B extend. (See Figs. 1, 2, and 3 of the drawings.)

I have shown the binder C placed along the edge of the board A, with the projecting parts $j$ extending in toward the center of the board; but it will be readily seen that the position of the binder C may be reversed, so that the uncut and continuous edge will be toward the center of the board A, and the projecting parts $j$ will extend toward the edge of the board, the binder being attached to the board in any suitable manner. In this case it would only be necessary to leave off the downward projection of the binder. (Shown in Fig. 2.)

What I have stated above in regard to the binder C is equally true in regard to the binder D, which may be made in the same manner to serve the same purpose; but in practice I prefer the construction shown in the drawings as being more efficient and desirable.

In order to more surely prevent any rattling, I have shown in the drawings a piece of felt or equivalent material, $o$, placed in a shallow channel or groove cut in the lower part of the binder D, where said binder comes in contact with the top of the board A. (See Fig. 2.) Said felt extends up on each side of the slots $n$, and across the top thereof, as clearly shown in Fig. 3. The use of the felt $o$ in the manner described may be dispensed with, if preferred.

The part marked E in the drawings is a strip hinged or fastened to the board A, by means of which the board is secured in its place under the key-board and raised or lowered in the usual manner.

I have shown in the drawings and described two binders, C and D, for holding in place the coupling-wires B; but it will be readily seen that by making the binder D wider, so that it will extend out farther over the coupling-wires B, the use of the binder C may be dispensed with, as the binder D alone will serve to hold the coupling-wires down in their proper positions and prevent them from being raised out of the corrugations or grooves *e*, in which case the arms *g* should be raised up a little higher than shown in the drawings, to allow of their extending over the binder D.

I prefer to use both binders C and D; but I do not wish to limit myself to the use of two binders, as only one binder, D, may be used, if preferred.

As the application and use of octave-couplers in organs is old and well known, and as my present invention relates only to my improved coupling device, which is designed to be used in connection with organs of different construction, I have not thought it necessary to show in the drawings or describe any of the parts of an organ, as the nature and scope of my invention will be readily understood by those skilled in the art without so doing.

Having described my improved coupling device, what I claim therein as new and of my invention, and desire to secure by Letters Patent, is—

1. The coupling-wire B, having its arm *g* screw-threaded and provided with an adjustable button, *h*, screwed thereon, substantially as and for the purpose herein specified.

2. The coupling-wire B, having the arm *d*, flattened and cut out at its outer end, substantially as shown, and for the purpose stated.

3. The coupling-wire B, having two arms, *d g*, projecting therefrom, one arm, *g*, being screw-threaded and provided with an adjustable button, *h*, screwed thereon, substantially as set forth.

4. The combination of the coupling-board A, provided with corrugations or grooves *e*, coupling-wires B, placed closely side by side in the said corrugations or grooves, binder C, provided with slots *i* and felting *k*, binder D, provided with slots *n* and felting *l*, and means for attaching the said binders to the coupling-board, substantially as described.

5. The combination, with the board A and coupling-wires B, having arms *g* and *d*, the arm *g* being provided with an adjustable button, *h*, of the binder C, provided with slots *i* and felting *k*, and binder D, provided with slots *n*, felting *l*, and felt *o*, all constructed substantially as shown and described.

6. The combination, with a coupling-board and coupling-wires, of the binder C, provided with slots *i* and felting *k*, and binder D, provided with slots *n* and felting *l*, and means for attaching said binders to the coupling-board, substantially as set forth.

7. The combination of a coupling-board, coupling-wires supported and turning thereon, each made in one piece, with the body portion straight and the ends bent to form arms approximately at right angles to the body, and a strip or binder, as D, attached to the coupling-board, and having vertical slots therein, through which the rear arms of the coupling-wires severally extend, the said slots forming guides to prevent endwise motion of the coupling-wires upon the coupling-board, substantially as set forth.

8. The combination of a coupling-board, coupling-wires supported and having their bearings thereon, each coupling made of one piece of wire bent to form transversely-projecting arms thereon, and a strip connected with the coupling board and provided with vertical cross-slots through which arms of the coupling-wires severally extend for the purpose of preventing endwise motion of the coupling-wires upon the coupling-board, substantially as set forth.

9. The combination of a coupling-board, coupling-wires supported and turning in corrugations or grooves in the said coupling-board, and a strip at the rear of the coupling-board having vertical slots through which the rear arms of the coupling-wires vertically extend, as and for the purpose herein set forth.

10. The combination of a coupling-board, coupling wires supported and turning on the said coupling-board and having arms projecting transversely therefrom, and a strip provided with transverse slots through which arms of the several coupling-wires extend, whereby the longitudinal movement of the said coupling-wires is prevented.

11. The combination of a coupling-board, coupling-wires arranged closely side by side on the coupling-board, and formed with transversely-projecting arms, and a part having slots or openings in which one set of the arms are severally placed, the said slots or openings serving to allow a vertical movement of the said arms and preventing a longitudinal movement of the coupling-wires.

ANDREW H. HAMMOND.

Witnesses:

JOHN J. DWYER,
JOHN C. DEWEY.